United States Patent
Hersans et al.

(10) Patent No.: US 9,110,959 B2
(45) Date of Patent: Aug. 18, 2015

(54) SYSTEM AND METHOD FOR GEO-LOCATION DATA TYPE SEARCHING IN AN ON DEMAND ENVIRONMENT

(71) Applicant: salesforce.com, inc., San Francisco, CA (US)

(72) Inventors: Alexandre Hersans, San Francisco, CA (US); Simon Y. Wong, San Carlos, CA (US); Shawna Wolverton, Oakland, CA (US); Junichiro Sekiguchi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 204 days.

(21) Appl. No.: 13/843,473

(22) Filed: Mar. 15, 2013

(65) Prior Publication Data
US 2014/0032533 A1  Jan. 30, 2014

Related U.S. Application Data

(60) Provisional application No. 61/641,955, filed on May 3, 2012.

(51) Int. Cl.
G06F 17/30 (2006.01)
G06F 7/00 (2006.01)

(52) U.S. Cl.
CPC .... *G06F 17/30554* (2013.01); *G06F 17/30241* (2013.01); *G06F 17/30522* (2013.01)

(58) Field of Classification Search
USPC .......................................... 707/722
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Kuen Lu
(74) *Attorney, Agent, or Firm* — Ingrassia Fisher & Lorenz, P.C.

(57) ABSTRACT

Methods and systems are provided for retrieving, from a database containing a list of records, a subset of the list of records located within a user defined distance from a target point, each record in the list of records having a compound geo-location data type including a first data field and a second data field. The method involves generating a circle around the target point; identifying records having a geo-location within the circle; including the identified records in a result set; and presenting the result set to a user on a display screen. The method further includes treating the first data field and the second data field as a single data element.

19 Claims, 5 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065959 A1* | 3/2005 | Smith et al. ............ 707/102 |
| 2005/0091098 A1 | 4/2005 | Brodersen et al. |
| 2006/0074660 A1* | 4/2006 | Waters et al. ............ 704/251 |
| 2008/0150736 A1* | 6/2008 | Fang ............ 340/600 |
| 2009/0063415 A1 | 3/2009 | Chatfield et al. |
| 2011/0250903 A1* | 10/2011 | Huang et al. ............ 455/456.1 |
| 2013/0158778 A1* | 6/2013 | Tengler et al. ............ 701/31.5 |

\* cited by examiner

SYSTEM AND METHOD FOR GEO-LOCATION DATA TYPE SEARCHING IN AN ON DEMAND ENVIRONMENT

CROSS-REFERENCE TO RELATED APPLICATION

This application claims the benefit of U.S. provisional patent application Ser. No. 61/641,955, filed May 3, 2012, the entire content of which is incorporated by reference herein.

TECHNICAL FIELD

Embodiments of the subject matter described herein relate generally to computer systems and applications for searching and sorting data based on strongly typed compound geo-location fields and, more particularly, to a method for filtering data based on rectangular indexes to thereby reduce the overall computational complexity of the remaining distance calculations.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Cloud-based computing environments are experiencing an increasing demand for mobile applications; that is, many users of multi-tenant and/or on demand data services are mobile, and seek to interrogate databases which contain devices which are also mobile. An important component of mobile applications involves location awareness. In order to provide a truly mobile enterprise computing platform, on demand computing providers desire to implement geo-location support. It is further desirable to provide users the capability to search and filter for records by location.

In conventional approaches, spatial options allow users to deal with locations using specific types and indexes. Unfortunately, conventional spatial indexes are typically domain indexes and cannot be easily mixed with other data columns. Consequently, presently known approaches are not adaptable to the on demand environment since a column (e.g., organization_id) cannot be added for tenant specific data.

Systems and methods are thus needed for enabling on demand and multi-tenant computing environments to perform queries using spatial information.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

Figure 4:
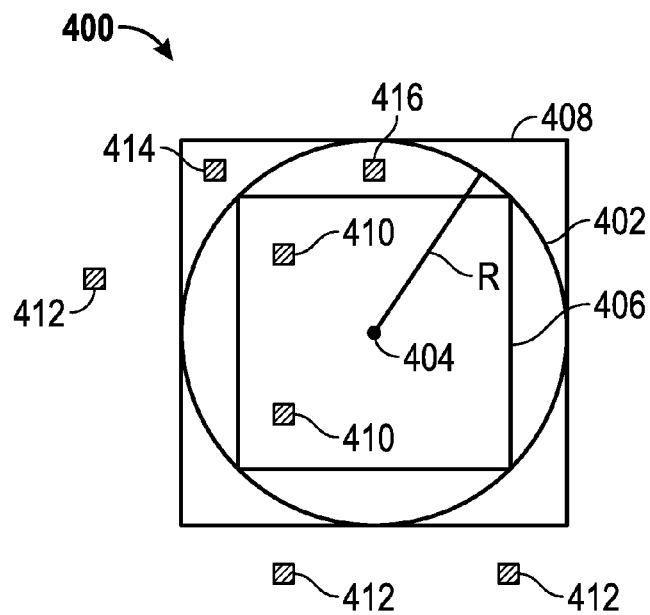
FIG. 4 is a conceptual block diagram illustrating a data filtering technique for a distance calculation query in accordance with an embodiment.
Figure 5:
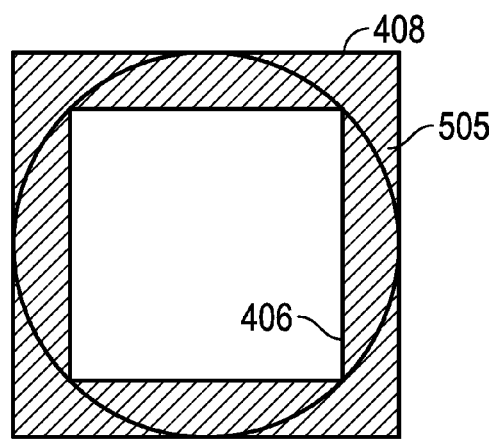
Figure 6:
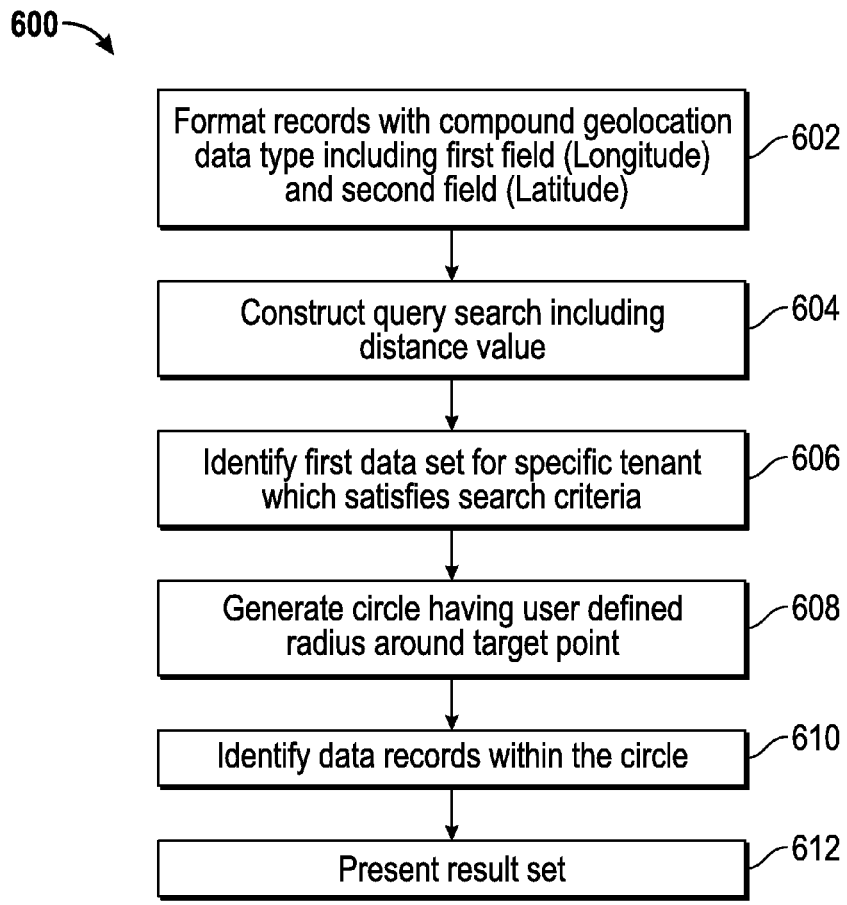
Figure 7:
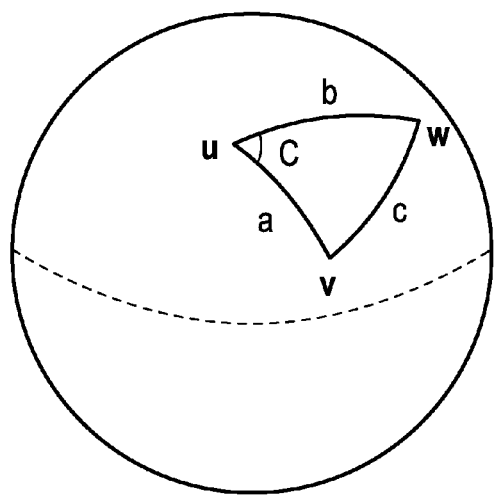

FIG. 5 is a conceptual block diagram illustrating a technique for reducing computational complexity of the distance calculation query shown in FIG. 4 in accordance with an embodiment; and FIG. 6 is a flow chart illustrating a method for retrieving a subset of records located within a user defined distance from a target point in a multi-tenant computing environment in accordance with an embodiment; and FIG. 7 is a unit sphere having a spherical triangle on its surface.

DETAILED DESCRIPTION

Embodiments of the subject matter described herein generally relate to providing geo-coded data in a multi-tenant database, and for searching and sorting the geo-coded data using an algorithm which filters the data prior to performing distance calculations on the filtered data to thereby reduce computational complexity. In an embodiment, a compound data type is provided that includes a first data field having a first data type, and a second data field having a second data type. Functions defined over the compound data field treat the first data field and the second data field as a single data element. For example, one embodiment comprises a "geo-location" compound data type that includes a first data field "longitude" and a second data field "latitude", expressible in decimal or degree notation (or both).

In a non-limiting example embodiment, a distance filtering mechanism is provided for retrieving a plurality of the records within a defined distance from a predetermined location (the target point). A circle having the defined radius is configured around the target point, and each data record having a geo-location within this circle is included in the result set.

To reduce the computational complexity associated with calculating the distance between the target point and each data record, the coordinates of the smallest square containing the circle are determined and any records outside this square are filtered out using regular indexes on the latitude and longitude fields of the records. In addition, the coordinates of the biggest square within the circle are determined so that the records inside this square are automatically included in the query results, again using regular indexes in lieu of distance calculations. Finally, distances are computed only for those records having geo-locations falling between the first square and the second square, and those records satisfying the distance criteria are added to the final search results.

To accommodate mobile applications, the target point may correspond to the user's past, present, or future location. Due to the temporal nature of location information the relevancy of search results may degrade over time, so that users may be shown relatively fewer matches for mobile devices who's location information was updated more remotely in time.

In an embodiment, a strongly typed location field is employed which includes a compound data definition for location. Specifically, a compound geo-location format includes both a longitude and a latitude field, expressed in one or both of decimal and degree format (e.g., 37.7749295 or N 37° 46' 29.7462"). Before discussing the filtering and distance calculation algorithm in detail, a brief over of the multi-tenant will now be provided as background.

Figure 1:
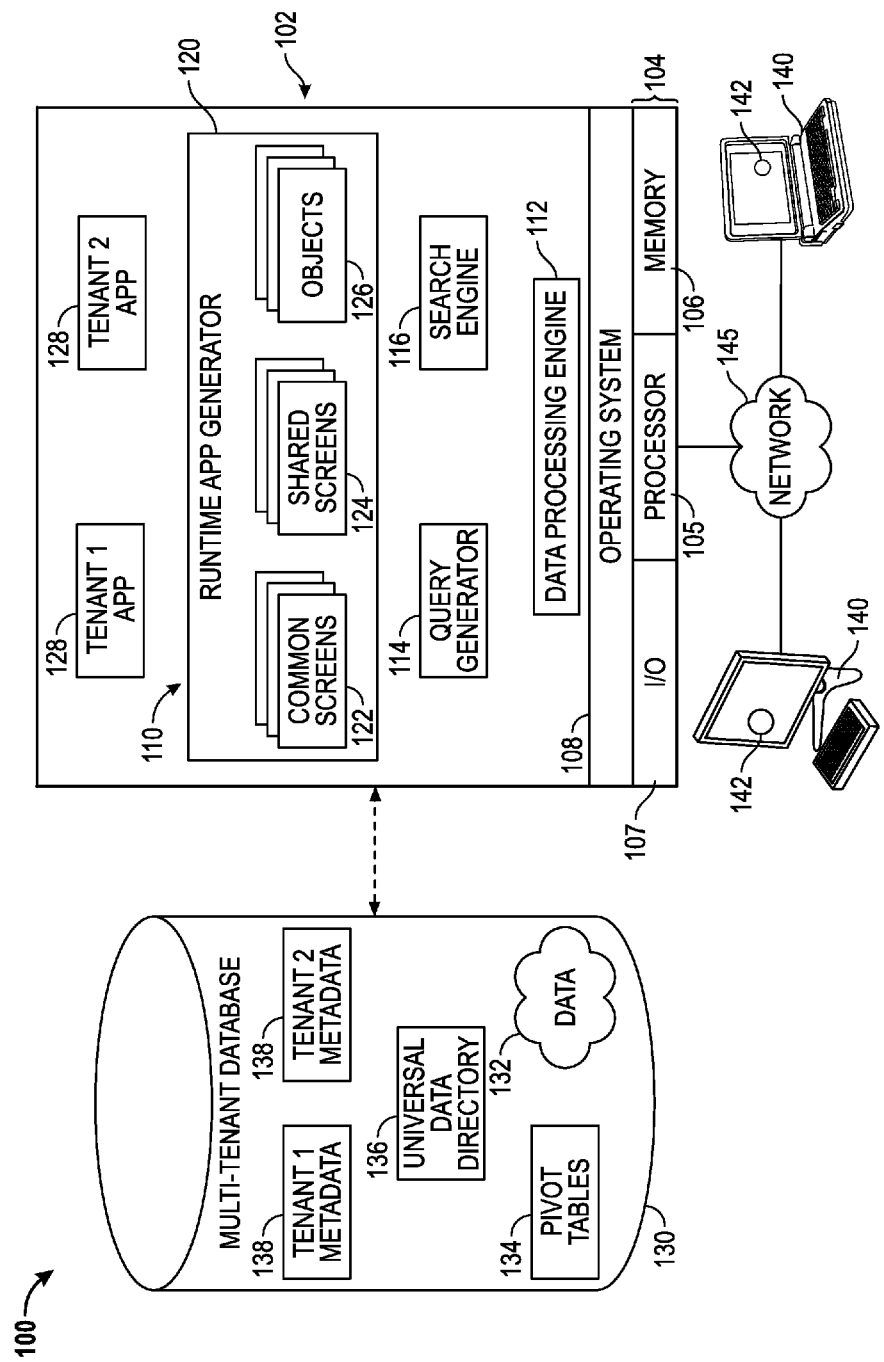
FIG. 1 is a schematic block diagram of a multi-tenant computing environment in accordance with an embodiment.

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In accordance with various embodiments, application 128 may include a feature for constructing queries using geo-coordinates. In particular, the feature may facilitate calculating distances between two compound data fields, or between a compound data field and a point. Application 128 may be configured to locate all data records for a particular tenant which satisfy traditional search criteria, and which also lie within a given radius from a user defined target location.

The present disclosure contemplates: i) formatting data according to a strongly typed location field (e.g., geo-coordinates); and ii) distance filtering using the compound geo-location data. To use the querying and reporting functionality disclosed herein with "old" data which does not comply with the compound geo-location field described herein, it is a necessary but straightforward task to convert the old data to the new strongly typed format to include a longitude and a latitude field. In an embodiment, distance queries may be constructed using the Salesforce Object Query Language (SOQL) available at www.salesforce.com.

Figure 2:
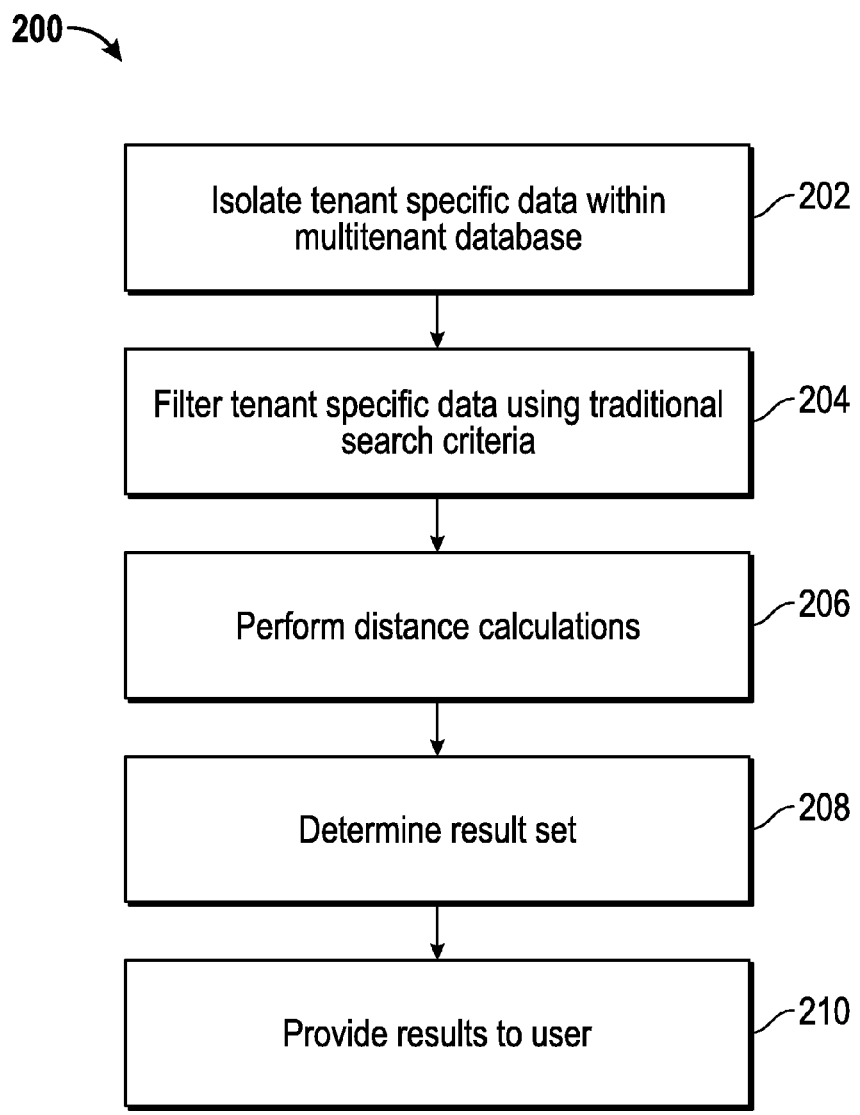
FIG. 2 is a flow chart illustrating a method for searching geo-coded data in a multi-tenant environment in accordance with an embodiment.

Referring now to FIG. 2, an exemplary method 200 for searching geo-coded data in a multi-tenant environment is provided. More particularly, the method 200 includes isolating (Task 202) data for a particular tenant within the multi-tenant database. Data records for that tenant may then be filtered (Task 204) by traditional search criteria to produce a first subset of data records. In this context, traditional search criteria may include, for example, last name, title, city, company, business type, and so on. For those data records which satisfy the traditional criteria, a distance calculation may be performed (Task 206) between the user defined target location and each data record, respectively, using the compound geo-location field associated with each data record.

Method 200 includes determining a result set (Task 208) by filtering those records from the first subset which also satisfy the distance criterion. The result set may then be provided (Task 210) to the user, for example, by displaying the results on a display screen.

Figure 3:
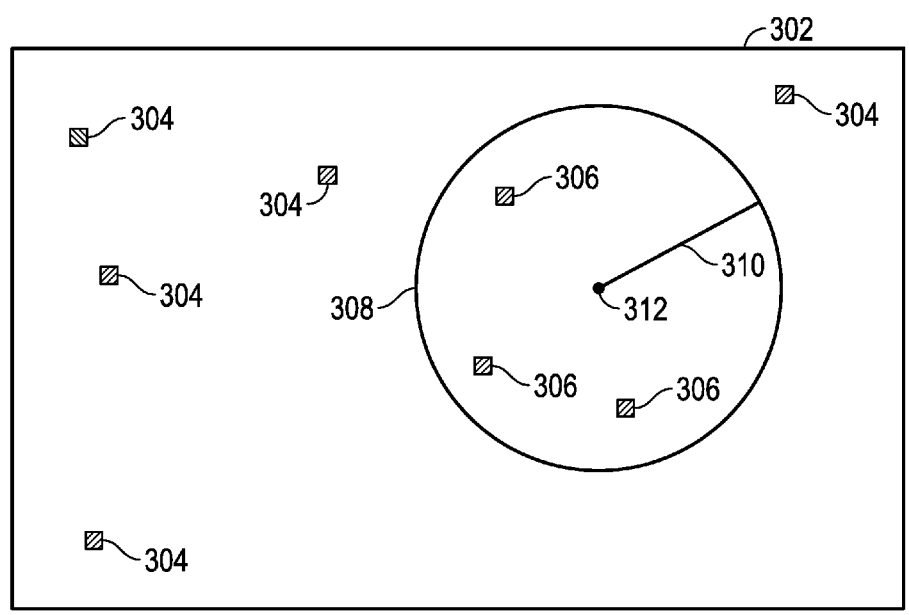
FIG. 3 is a schematic block diagram of a distance query in accordance with an embodiment.

FIG. 3 is a schematic block diagram illustrating the salient aspects of the method described in FIG. 2. In particular, FIG. depicts a data set 302 which includes a plurality of data records for a particular tenant within a multi-tenant database. A circle 308, having a radius 310 and an origin 312, represents a distance query such as "find all of my friends that are currently within two miles of me", where the origin 312 represents the user ("me") and the radius 310 corresponds to the two mile user defined radius.

Data set 302 includes a plurality of data records 306 which are within the circle 308, as well as a plurality of data records 304 which lie outside the circle 308. In order to reduce the computational complexity associated with calculating distances for all of the data records 304 and 308, the following filtering algorithm may be employed.

More particularly, custom fields in multi-tenant databases are managed in what are referred to as slots. Traditional custom fields use a single slot for any data type, but geo-location data uses two slots, one for latitude and one for longitude. These components may be exposed as traditional numeric custom fields, or together as a compound field. In accordance with an embodiment, a third slot or third column of data is used in connection with the geo-location data field. Specifically, one embodiment contemplates transforming latitude and longitude into a three-dimensional coordinate system, and calculating a Euclidian distance using the geo-location fields. The distance is then encoded into the third custom field slot.

This may be implemented by augmenting the existing Salesforce object query language (SOQL) and thereby provide a new syntax for querying records that are within a given distance from a target point based on information stored in the third column. By way of non-limiting example, consider a location field called MyLocationField. To search for records having a MyLocationField within, say, ten miles from San Francisco (latitude 37.77; longitude −122.42), the following SOQL code may be used:

SELECT Id
FROM Account
WHERE distance(MyLocationField_c, GeoLocation(37.77, −122.42), 'mi'<=10

The distance function can be used for filtering (in the WHERE clause), sorting (in the ORDER BY clause), and for querying (in the SELECT clause). Similarly, a user can create a formula field that uses distance-based functions. Specifically, on the account entity, a geo-location field may be added, called MyLocationField, and a formula field added, called MyDistance ToSanFranciscoField that may defined through the following formula: Distance(MyLocationField_c, Geolocation(37.77, −122.42), 'mi').

FIG. 4 is a conceptual block diagram illustrating a filtering technique 400 for retrieving a plurality of data records within a distance (radius) R from a target point 404 in accordance with an embodiment. More particularly, a circle 402 having radius R may be constructed around the target 404. Each record having a geo-location within the circle 402 is to be included in the result set. However, calculating distances for all of the data records both inside and outside the circle to determine which ones lie within the circle is computationally intensive. Accordingly, the following shortcut which exploits the geometric relationships between the circle, an inclusive square, and an exclusive square may be employed to reduce the computational complexity of the distance calculations.

With continued reference to FIG. 4, the coordinates of the smallest square 408 containing the circle 402 are determined. All of the records 412 located outside this square 408 are filtered out using regular indexes on the latitude and longitude fields of the records. Significantly, this initial filtering may be accomplished without the need for performing computationally intensive distance calculations. Rather, the latitude and longitude values for each record 412 may simply be compared to the latitude and longitude value of square 408 to perform this high level filtering operation. Techniques for representing custom fields and for using custom indexes in the context of a multi-tenant database are described in: i) U.S. Patent Application No. 20130018890 published Jan. 17, 2013 and entitled "Creating a Custom Index in a Multi-Tenant Database Environment"; ii) U.S. Pat. No. 8,386,471 B2 issued Feb. 26, 2013 and entitled "Optimizing Queries in a Multi-tenant Database System Environment"; and iii) European Patent Publication No. EP2315127 A1 published Apr. 27, 2011 and entitled "Custom Entities and Fields in a Multi-Tenant Database System"; the entire contents of which are all hereby incorporated herein by this reference.

With continued reference to FIG. 4, the coordinates of the biggest square 406 included within the circle 402 are determined. All of the records 410 located inside this square are automatically included in the result set, again using regular indexes on the latitude and longitude fields of the records. As before, this filtering may be accomplished without the need for performing computationally intensive distance calculations.

Referring now to FIGS. 4 and 5, distances are computed only for those records having geo-locations falling between the two squares, that is, those records within the cross-hatched region 505 which is both outside square 406 and inside square 408. Based on these distance calculations, all of the records 414 which lie outside the circle 402 are excluded from the result set, and all of the records 416 which lie inside the circle 402 are added to the result set to yield the final result set.

In accordance with various embodiments, any suitable technique may be used for determining distances, such as, for example, one or more of the following methods: i) haversine; ii) spherical law of cosines; and iii) Euclidian distance.

More particularly, the haversine formula is an equation for calculating great-circle distances between two points on a sphere from their longitudes and latitudes. The haversine formula is a special case of a more general formula in spherical trigonometry, the law of haversines, relating the sides and angles of spherical triangles. For any two points on a sphere, the haversine of the central edge between them is given by:

haversin($d/r$)=haversin($\phi_2-\phi_1$)+cos($\phi_1$)cos($\phi_2$)haversin($\lambda_2-\lambda_1$)

where:
haversin is the haversine function:

$$haversin(\theta) = \sin^2\left(\frac{\theta}{2}\right) = \frac{1-\cos(\theta)}{2}$$

d is the distance between the two points (along a great circle of the sphere; see spherical distance);
r is the radius of the sphere;
$\phi_1$ is the latitude of point 1 and $\phi_2$ is the latitude of point 2; and
$\lambda_1$ is the longitude of point 1 and $\lambda_2$ is the longitude of point 2.

On the left side of the equals sign d/r is the central angle, measured in radians. The distance d may be solved for by applying the inverse haversine or by using the arcsine (inverse sine) function:

$d=r$ haversin$^{-1}(h)=2r$ arcsin($\sqrt{h}$)

where h is haversin (d/r), or more explicitly:

$$d = 2r \arcsin\left(\sqrt{haversin(\phi_2-\phi_1)+\cos(\phi_1)\cos(\phi_2)haversin(\lambda_2-\lambda_1)}\right)$$
$$= 2r \arcsin\left(\sqrt{\sin^2\left(\frac{\phi_2-\phi_1}{2}\right)+\cos(\phi_1)\cos(\phi_2)\sin^2\left(\frac{\lambda_2-\lambda_1}{2}\right)}\right)$$

In spherical trigonometry, the spherical law of cosines is a theorem relating the sides and angles of spherical triangles, analogous to the ordinary law of cosines from plane trigonometry. Given the unit sphere shown in FIG. 7, a "spherical triangle" on the surface of the sphere is defined by the great circles connecting the three points u, v, and w on the sphere. If the lengths of these three sides are a (from u to v), b (from u to w), and c (from v to w), and the angle of the corner opposite c is C, then the spherical law of cosines states:

cos($c$)=cos($a$)cos($b$)+sin($a$)sin($b$)cos($C$)

Since this is a unit sphere, the lengths a, b, and c are simply equal to the angles (in radians) subtended by those sides from the center of the sphere (for a non-unit sphere, they are the distances divided by the radius).

The Euclidean distance between two points p and q may be defined as the length of the line segment connecting them ($\overline{pq}$). In a Cartesian coordinate system, if p=(P(longitude), P(latitude)) and q=(Q(longitude, Q(latitude)) are two points in space, then the distance D between them is given by:

$D=[(P_{longitude}-Q_{longitude})^2+(P_{latitude}-Q_{latitude})^2]^{1/2}$.

FIG. 6 is a flow chart illustrating a method 600 for retrieving a subset of records located within a user defined distance from a target point in a multi-tenant computing environment. Method 600 includes formatting (Task 602) each record in the list of records with a compound geo-location data type including a first data field and a second data field. Method 600 further includes constructing (Task 604) a query including search criteria and a distance value; identifying (Task 606) a first set of data for a particular tenant within the multi-tenant database which satisfies the search criteria; defining (Task 608) a target point and generating a circle having a radius R around the target point; identifying a second set of data records (Task 610) having a geo-location within the circle, wherein the second set of data is a subset of the first set of data; and including the identified records in a result set and presenting the result set to a user on a display screen (Task 612).

A method is thus provided for retrieving, from a database containing a list of records, a result set of the list of records located within a user defined distance from a target point, each record in the list of records having a compound geo-location data type including a first data field and a second data field. The method includes: generating a circle around the target point; identifying a subset of the list of records having a geo-location within the circle; including the identified records in a result set; and presenting the result set to a user on a display screen, wherein identifying comprises treating the first data field and the second data field as a single data element.

In an embodiment, the first and second data fields correspond to latitude and longitude, and the target point is one of the user's past, present, and future location.

In a further embodiment, the step of identifying a subset includes determining the coordinates of a first square comprising the smallest dimensions which contain the circle; identifying the records outside the first square; and filtering out any records outside the first square from the result set, wherein filtering out may be based on using regular indexes on the latitude and longitude fields of the records.

In an embodiment, identifying a subset may include determining the coordinates of a second square comprising the largest dimensions included within the circle; identifying the records within the second square; and including in the result set any records within the second square. Moreover, identifying the records within the second square may include using regular indexes on the latitude and longitude fields of the records.

In another embodiment, the step of identifying records having a geo-location within the circle involves computing distances for those records having geo-locations falling between the first square and the second square, for example, using one of: the haversine formula; the spherical law of cosines; and the Euclidian distance theorem.

In a further embodiment, the actual distance for those records lying between the first and second squares is calculated, and the actual distance for records not lying between the first and second squares is not calculated.

In yet a further embodiment, the database comprises a multi-tenant database.

In a multi-tenant computing environment of the type including a multi-tenant database, a method of searching for a subset of records based on distance from a user defined target location is also provided. The method includes formatting each record in the list of records with a compound geo-location data type including a first data field and a second data field; constructing a query including search criteria and a distance value; identifying a first set of data for a particular tenant within the multi-tenant database which satisfies the search criteria; defining a target point and a radius R; generating a circle having a radius R around the target point; identifying a second set of data records having a geo-location within the circle, wherein the second set of data is a subset of the first set of data; including the identified records in a result set; and presenting the result set to a user on a display screen.

In an embodiment, identifying the second set of data records involves treating the first data field and the second data field as a single data element, and the first and second data fields comprise latitude and longitude values, expressed in either decimal or degree notation.

In a further embodiment, identifying the second set of data records includes determining the coordinates of a first square comprising the smallest dimensions which contain the circle; identifying the records outside the first square; and filtering out any records outside the first square from the result set, wherein filtering out may be based on the use of regular indexes on the latitude and longitude fields of the records.

In another embodiment, identifying the second set of data records includes determining the coordinates of a second square comprising the largest dimensions included within the circle; identifying the records within the second square; and including in the result set all records within the second square. In addition, identifying the records within the second square may involve using regular indexes on the latitude and longitude fields of the records.

In another embodiment, identifying records having a geo-location within the circle may involve computing distances for those records having geo-locations falling between the first square and the second square, and wherein the actual distance for the records lying between the first and second squares is computed, and the actual distance for those records not lying between the first and second squares need not be computed.

A computer application embodied in a non-transitory for operation by a computer processor medium is also provided for performing the steps of: generating a circle around the target point; identifying records having a geo-location within the circle; including the identified records in a result set; and presenting the result set to a user on a display screen; wherein identifying comprises treating the first data field and the second data field as a single data element.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of retrieving, from a database containing a list of records, a result set of the list of records located within a user defined distance from a target point, each record in the list of records having a compound geo-location data type including a first data field and a second data field, the first and second data fields comprising latitude and longitude, the method comprising:
   generating a circle around the target point with a radius corresponding to the user defined distance;
   identifying a subset of the list of records having a geo-location within the circle, wherein identifying the subset comprises:
      determining the coordinates of a first square comprising the smallest dimensions which contain the circle;
      identifying the records outside the first square; and
      filtering out any records outside the first square from the result set;
   including the identified records in a result set; and
   presenting the result set to a user on a display screen;
      wherein identifying comprises treating the first data field and the second data field as a single data element.

2. The method of claim 1, wherein the target point is one of the user's past, present, and future location.

3. The method of claim 2, wherein filtering out comprises filtering out using regular indexes on the latitude and longitude fields of the records.

4. The method of claim 1, wherein identifying a subset further comprises:
   determining the coordinates of a second square comprising the largest dimensions included within the circle;
   identifying the records within the second square; and
   including in the result set any records within the second square.

5. The method of claim 4, wherein the identifying the records within the second square comprises using regular indexes on the latitude and longitude fields of the records.

6. The method of claim 4, wherein identifying records having a geo-location within the circle comprises computing distances for those records having geo-locations falling between the first square and the second square.

7. The method of claim 6, wherein computing distances comprises calculating distance values using one of: the haversine formula; the spherical law of cosines; and the Euclidian distance theorem.

8. The method of claim 6, wherein the actual distance for the records lying between the first and second squares is calculated, and the distance for records not lying between the first and second squares is not calculated.

9. The method of claim 4,
   wherein the determining the coordinates of the first square includes defining the side length of the first square to be twice the radius such that the first square circumscribes the circle, and
   wherein the determining the coordinates of the second square includes defining the diagonal length of the second square to be twice the radius such that the second square is inscribed by the circle.

10. The method of claim 1, wherein the database comprises a multi-tenant database.

11. In a multi-tenant computing environment of the type including a multi-tenant database, a method of searching for a subset of records based on distance from a user defined target location, the method comprising:
   formatting each record in the list of records with a compound geo-location data type including a first data field comprising latitude and a second data field comprising longitude;
   constructing a query including search criteria and a distance value;
   identifying a first set of data for a particular tenant within the multi-tenant database which satisfies the search criteria, wherein identifying the second set of data records comprises treating the first data field and the second data field as a single data element;
   defining a target point and a radius R;
   generating a circle having a radius R around the target point;
   identifying a second set of data records having a geo-location within the circle, wherein the second set of data is a subset of the first set of data,
   wherein identifying the second set of data records further comprises:
      determining the coordinates of a first square comprising the smallest dimensions which contain the circle;
      identifying the records outside the first square; and
      filtering out any records outside the first square from the result set;
   including the identified records in a result set; and
   presenting the result set to a user on a display screen.

12. The method of claim 11, wherein filtering out comprises filtering out using regular indexes on the latitude and longitude fields of the records.

13. The method of claim 12, wherein identifying the second set of data records further comprises:
   determining the coordinates of a second square comprising the largest dimensions included within the circle;
   identifying the records within the second square; and
   including in the result set all records within the second square.

14. The method of claim 13, wherein the identifying the records within the second square comprises using regular indexes on the latitude and longitude fields of the records.

15. The method of claim 14, wherein identifying records having a geo-location within the circle comprises computing distances for those records having geo-locations falling between the first square and the second square.

16. The method of claim 15, wherein the actual distance for the records lying between the first and second squares is computed, and the actual distance for those records not lying between the first and second squares is not computed.

17. The method of claim 16,
   wherein the determining the coordinates of the first square includes defining the side length of the first square to be twice the radius R such that the first square circumscribes the circle, and
   wherein the determining the coordinates of the second square includes defining the diagonal length of the second square to be twice the radius R such that the second square is inscribed by the circle.

18. A computer application embodied in a non-transitory medium for operation by a computer processor for performing the steps of:
   generating a circle centered around the target point, the circle defined by a radius;
   identifying records having a geo-location within the circle, wherein identifying the results set includes
      defining a first square being centered around the target point with a side length of the first square being equal to twice the radius of the circle such that the first square circumscribes the circle,
      identifying the records outside of the first square and filtering out any records outside of the first square from the results set,
   including the identified records in a the result set; and
   presenting the result set to a user on a display screen;
   wherein identifying comprises treating the first data field and the second data field as a single data element.

19. The computer application of claim 18, wherein identifying the results set further includes
   defining a second square centered around the target point with a diagonal of the second square being equal to twice the radius of the circle such that the second square is inscribed within the circle,
   identifying the records inside of the second square and including in the results set all records within the second square,
   computing distances for those records having geo-locations falling between the first square and the second square, and
   identifying the records within the circle according to the computed distances for those records having geo-locations falling between the first square and the second square.

* * * * *